(12) United States Patent
Martin et al.

(10) Patent No.: US 9,273,521 B2
(45) Date of Patent: Mar. 1, 2016

(54) THREADED CONNECTION

(75) Inventors: Pierre Martin, Valenciennes (FR);
Bertrand Maillon, Saint-Etienne (FR)

(73) Assignees: VALLOUREC OIL AND GAS FRANCE, Aulnoye-Aymeries (FR);
SUMITOMO METAL INDUSTRIES, Ltd., Osaka-shi (JP)

(*) Notice: Subject to any disclaimer, the term of this patent is extended or adjusted under 35 U.S.C. 154(b) by 863 days.

(21) Appl. No.: 13/510,697

(22) PCT Filed: Nov. 9, 2010

(86) PCT No.: PCT/EP2010/006823
§ 371 (c)(1),
(2), (4) Date: May 18, 2012

(87) PCT Pub. No.: WO2011/060894
PCT Pub. Date: May 26, 2011

(65) Prior Publication Data
US 2013/0069364 A1 Mar. 21, 2013

(30) Foreign Application Priority Data
Nov. 20, 2009 (FR) .................................. 09 05586

(51) Int. Cl.
*F16L 25/00* (2006.01)
*E21B 17/042* (2006.01)
(Continued)

(52) U.S. Cl.
CPC .............. *E21B 17/042* (2013.01); *F16L 15/004* (2013.01); *F16L 15/06* (2013.01)

(58) Field of Classification Search
USPC .................................. 285/333, 334, 355, 390
See application file for complete search history.

(56) References Cited

U.S. PATENT DOCUMENTS

| 3,870,351 A | 3/1975 | Matsuki |
| RE30,647 E * | 6/1981 | Blose .......................... 285/332.2 |
| 4,611,838 A | 9/1986 | Heilmann et al. |

(Continued)

FOREIGN PATENT DOCUMENTS

| CN | 201288903 Y | 8/2009 |
| EP | 0 488 912 A2 | 6/1992 |

(Continued)

OTHER PUBLICATIONS

International Search Report Issued Sep. 5, 2011 in PCT/EP10/06823 Filed Nov. 9, 2010.

*Primary Examiner* — Aaron Dunwoody
(74) *Attorney, Agent, or Firm* — Oblon, McClelland, Maier & Neustadt, L.L.P.

(57) ABSTRACT

A threaded connection including first and second tubular components including respective male and female ends including a distal surface and a threaded zone. The threaded zone of the male end is threaded into the threaded zone of the female end. The threaded zones include respective male and female threads having increasing width from the distal surface and including load flanks having negative angles over at least a portion of their radial dimension, and stabbing flanks, with a radial clearance in the connected state between crests of the male threads and roots of the female threads and/or between crests of the female threads and roots of the male threads, with an axial clearance in the connected state between the stabbing flanks of the male and female threads. The distal surface of the male and/or female end is brought into axial abutting contact against a corresponding abutment surface.

18 Claims, 2 Drawing Sheets

(51) Int. Cl.
*F16L 15/00* (2006.01)
*F16L 15/06* (2006.01)

(56) References Cited

U.S. PATENT DOCUMENTS

| | | | |
|---|---|---|---|
| 4,629,222 A * | 12/1986 | Dearden et al. | 285/332.4 |
| 4,822,081 A | 4/1989 | Blose | |
| 5,462,315 A | 10/1995 | Klementich | |
| 6,026,436 A * | 2/2000 | Hawes | 709/218 |
| 6,047,797 A | 4/2000 | Popjoy | |
| 6,155,613 A | 12/2000 | Quadflieg et al. | |
| 6,158,785 A * | 12/2000 | Beaulier et al. | 285/334 |
| 2002/0027363 A1 | 3/2002 | Mallis et al. | |
| 2004/0262919 A1 * | 12/2004 | Dutilleul et al. | 285/333 |
| 2006/0145480 A1 * | 7/2006 | Mallis et al. | 285/390 |
| 2007/0236015 A1 * | 10/2007 | Sugino et al. | 285/334 |
| 2011/0278838 A1 | 11/2011 | Martin et al. | |

FOREIGN PATENT DOCUMENTS

| | | |
|---|---|---|
| EP | 1 046 179 A1 | 10/2000 |
| EP | 1 302 623 A1 | 4/2003 |
| JP | 2002/081584 A | 3/2002 |
| WO | 2007/017082 A1 | 2/2007 |

* cited by examiner

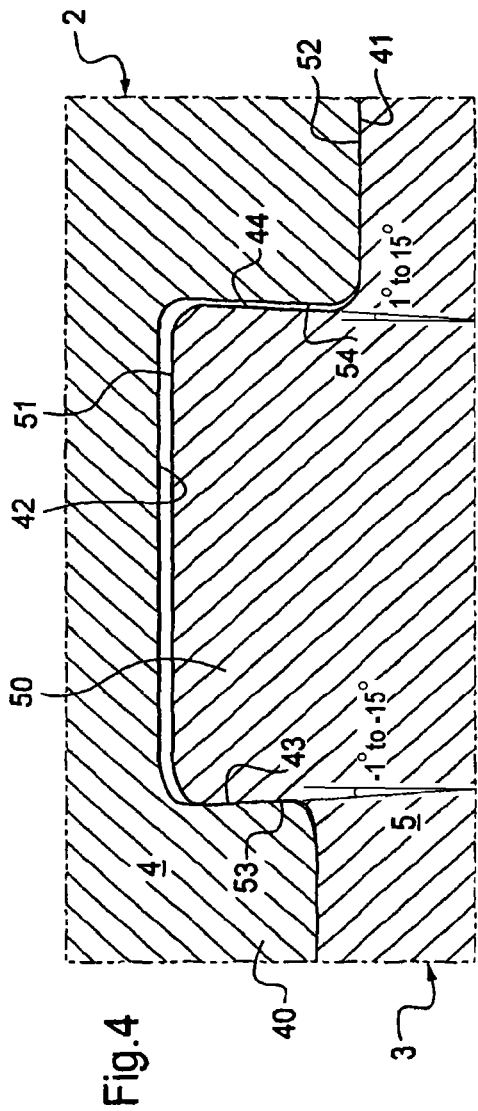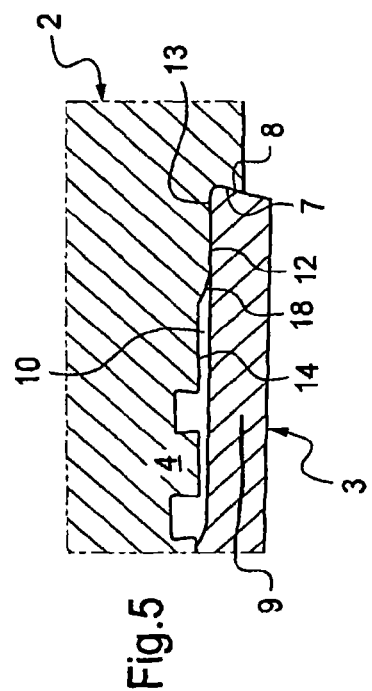

THREADED CONNECTION

BACKGROUND OF THE INVENTION

1. Field of the Invention

The invention relates to the field of tight connections for tubular components, used in particular for drilling or the operation of hydrocarbon wells. During drilling or operation, the connections are subjected to large compressive and tensile stresses and must not come apart.

2. Description of the Related Art

Such connections are subjected to axial tensile or compressive stresses, to internal or external fluid pressure stresses, to bending or even torsional stresses, possibly combined and with an intensity which may fluctuate. The tightness must subsist despite the stresses and despite harsh on-site conditions of use. Threaded connections must be able to be made up and broken out several times without their performance degrading, in particular by galling. After breakout, the tubular compounds may be re-used under other conditions of service.

Under tension, a phenomenon termed jump-out may occur and be propagated from one thread to another, risking that the connection will come apart. That phenomenon is facilitated by a high internal pressure.

BRIEF SUMMARY OF THE INVENTION

The invention proposes an improved connection as regards its tensile behaviour.

The threaded connection comprises a first and a second tubular component. The first component comprises a male end provided with an external peripheral surface comprising a threaded zone, a sealing surface then an axial abutment surface. The second component comprises a female end provided with an internal peripheral surface comprising an axial abutment shoulder, a sealing surface and a threaded zone. The threaded zone of the male end is threaded into the threaded zone of the female end so that the respective sealing surfaces are in interfering contact and so that the respective abutment surfaces are in contact. The threaded zones are provided with threads comprising a root, a crest, a stabbing flank and a load flank, with an axial clearance subsisting between the thread crests and roots in the connected state and with a radial clearance subsisting between the stabbing flanks in the connected state. The axial dimension of the threads varies. The load flank and the stabbing flank have negative angles over at least a portion of their radial dimension.

The term "threading-up" means the operation of relative rotation and translation of one component with respect to the other with mutual engagement of threaded zones. The term "connection" or "makeup" means an operation which follows threading-up, continuing the relative rotation and translation, resulting in a given makeup torque between the two components. The angle of the flanks is measured in the clockwise direction with respect to a radial plane passing through the base of the flanks at the level of the curvature connecting with the root.

BRIEF DESCRIPTION OF THE SEVERAL VIEWS OF THE DRAWINGS

Further characteristics and advantages of the invention will become apparent from the following detailed description and drawings in which:

FIG. 4 diagrammatically shows a detail of the threaded zone of the connection; and FIG. 5 diagrammatically shows one end of the male portion.

Figure 1:
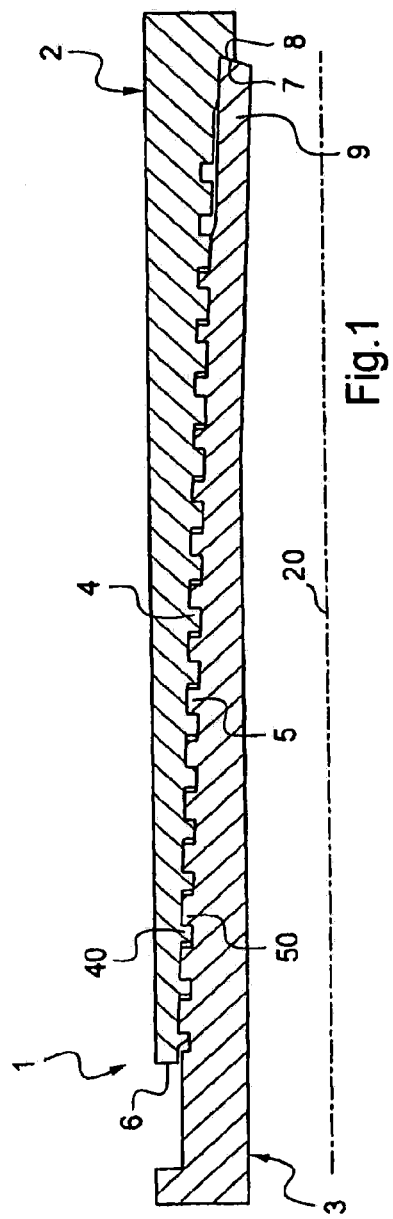
FIG. 1 diagrammatically shows a first threaded connection in longitudinal section.

The accompanying drawings will not only serve to complete the invention but also, if necessary, to contribute to its definition.

DETAILED DESCRIPTION OF THE INVENTION

In order to improve connections, the Applicant has developed superior connections, termed premium connections, which exceed API standards. As an option, sealing surfaces may be provided adjacent to the threaded zones, said surfaces being brought into interfering contact when threading-up the components.

The threaded zones are provided at the end of each of the male and female tubular components. The female tubular component may be a great length tube or, in contrast, a short coupling type tube. The tightness to high pressure fluids (liquid or gas) thus results from bringing the sealing surfaces into mutual radially interfering contact. The intensity of the radial interfering contact is a function of the relative axial positioning of the male and female threaded zones, said relative positioning being determined by contact of the abutment surfaces provided respectively on the male and female ends.

The relative positioning results from contact of the abutments. The abutment surfaces are provided on the internal surface of the connection. On its external periphery, the male end comprises a threaded zone extended by a sealing surface which is itself extended by a terminal portion finishing in an abutment surface which is orientated radially with respect to the axis of revolution of the connection. On its internal periphery, the female end comprises a threaded zone extended by a sealing surface which is itself extended by a terminal portion finishing in an abutment surface which is orientated radially with respect to the axis of revolution of the connection. The connection thus has a double abutment. Other connections have a single abutment, radially externally of the threaded zone or internally of the threaded zone.

The Applicant has particularly focused on large diameter threaded connections with a diameter of more than 300 mm, more particularly more than 375 mm. Such connections are occasionally subjected to intense tensile and compressive loads. Thus, it is desirable that the connection performs well under tension and in compression. When the tensile load is excessive, the threads can separate from each other by a disengaging phenomenon which causes the two components of the connection to separate. The consequences can be particularly annoying from a technical and cost viewpoint. This is particularly the case when the threading has a tapered generatrix; jump-out of a thread can cause the connection to come apart completely.

U.S. Pat. No. 4,822,081 describes a threading for male and female connections used in oil exploration tubes. The threads are of the self-locking type with contact between the flanks when the shoulders and the end surfaces are just in contact. The abutment surfaces are tapered at different angles. The threads are also self-clinching in the radial direction. That type of self-locking and self-clinching threaded connection necessitates a very high makeup torque which is difficult to achieve for large diameter tubes. The free volume in the threading being very low, the threading-up may cause the grease to come under a high pressure, which may cause leaks. The axial positions of the abutment surfaces with respect to the threads being uncertain because of the industrial tolerances, there may result a poor positioning of the sealing surfaces and consequently a leak. The end of the threading-up operation is barely capable of being detected by determination of an upper limit to the torque, due to the absence of a positive abutment during threading-up. The abutments are reached during final makeup. An excessive threading-up torque may result in plastic deformation of the sealing surfaces, which deleteriously affects the seal of the connection.

The document U.S. Pat. No. 5,462,315 describes a tubular connection with a central seal between two portions of the threading. The load flanks of the threads are in mutual contact after makeup. The disadvantages are substantially the same as for the preceding type.

The documents US 2002/27363, EP-1 046 179 and EP-1 302 623 envisage contact of the thread flanks after makeup.

The document JP 2002/081584 discloses a thread profile with hook cooperation. Those hooks support all of the tensile loads and radial displacement loads, which may cause damage to the threads with repetitive, cyclic forces. The tensile loads must remain low due to the small surface area via which they are transmitted. The stabbing flanks are steeply inclined, which is deleterious to compressive strength. A high threading-up torque is necessary because of the interference between the thread crests and valleys.

The Applicant has developed a connection which greatly reduces the risk of jump-out independently of the position of the thread, at a low threading-up torque, which allows the bearing surfaces to be properly positioned and has sufficient space for grease. The threading has a variable thread width. An axial clearance between the stabbing flanks is present in the connected state, i.e. after makeup, and also there is a radial clearance present between the thread roots and crests. The load flanks of the threads are at a negative angle. The stabbing flanks of the threads are at a positive angle. An abutment allows proper positioning of the sealing surfaces.

As can be seen in FIG. 1, a threaded tubular connection 1 comprises a female end 2 and a male end 3. The female end 2 and/or the male end 3 may belong to a tube several meters in length, for example of the order of 10 to 15 meters long. One end, generally female, may constitute the end of a coupling, in other words a short length tube enabling to connect together two great length tubes each provided with two male ends (threaded and coupled connection known as T&C connection). A coupling may be provided with two female ends. In a variation, a great length tube may be provided with one male end and one female end (integral threaded connection). The connection 1 is of the industrially mass produced type.

The connection 1 may be used to constitute casing strings or tubing strings for hydrocarbon wells, or work-over risers or drillpipe strings for the same wells.

The tubes may be produced in different types of non-alloyed, low alloy or high alloy steel, or even in ferrous or non-ferrous alloys, which are heat treated or cold-worked depending on their service conditions, such as, for example: the level of mechanical stress, the corrosive nature of the fluid inside or outside the tubes, etc. It is also possible to use low corrosion resistance steel tubes coated with a protective coating, for example an alloy which is resistant to corrosion or a synthetic material.

The threaded female end 2 comprises a female threaded zone 4. The female threaded zone 4 is tapered, for example with a half-angle in the range 0.5° to 3°, preferably in the range 1° to 2°. The female threaded zone 4 is disposed on the inside of the female element 2. The male end 3 comprises a male threaded zone 5 disposed on an external surface of said male end 3. The male threaded zone 5 mates with the female threading 4. The male threaded zone 5 has a taper which is substantially equal to that of the female threaded zone 4. On the side opposite to the abutment surfaces 7 and 8 with respect to the threaded zones 4 and 5, the female end 2 comprises a distal surface 6 which is substantially perpendicular to the axis 20 of the connection. The term "distal surface" means a surface situated between a threaded zone, continuous or discontinuous, and the free end of the element, male or female. A distal surface may be located at said free end. In this case, the distal surface 6 is terminal.

The female threaded zone 4 extends up to adjacent to the terminal surface 6. In the connected state, the terminal surface 6 is separated from any optional substantially radial surface of the male end 3, in particular a shoulder, by at least 0.1 mm, for example.

The distal surface of the male end 3 is in the form of an annular surface, in this case tapered. The distal surface form an axial abutment surface 7 which enables to limit relative axial movement between the female end 2 and the male end 3. The abutment surface 7 is in contact against a shoulder of the female end 2 also forming an abutment surface 8, in this case tapered. The abutment surface 7 may be radial or inclined at an angle of up to 45° with respect to a radial plane. In the example shown in FIG. 1, the angle is of the order of 15° to 25°.

Between the threaded zone 4 and the abutment surface 8, the female end comprises a substantially tapered surface 12 and optionally a recess 10, see FIG. 5. The recess 10 may have a substantially cylindrical surface 14 and a surface of revolution 18 disposed between the threaded zone 4 and the substantially tapered surface 12. The substantially tapered surface 12 is adjacent to the abutment surface 8. The recess 10 may act as a reservoir for grease when grease is expelled from between the threaded zones 4 and 5, on threading-up. As can be seen in FIG. 1, at least one hollow of the threaded zone 4 adjacent to the substantially cylindrical surface 14 is free in the connected state and participates in collecting excess grease. The surface of revolution 18 connects the substantially cylindrical surface 14 to the abutment surface 8. The abutment surface 8 may have a tapered shape as in document EP-0 488 912, a toroidal shape as in document U.S. Pat. No. 3,870,351 or in WO-2007/017082, or multi-stage as in document U.S. Pat. No. 4,611,838, with a protuberance as in document U.S. Pat. No. 6,047,797, or a combination of those shapes. The reader is invited to refer to these documents.

The male end 3 comprises a lip 9 extending axially beyond the male threaded zone 5 up to the abutment surface 7. The outside of the lip 9 comprises a substantially tapered surface 13 with an axial length slightly longer than the axial length of the surface of revolution 12, which is substantially tapered, of the female end 2. A portion of the surface of revolution 13 and a portion of the surface of revolution 12 are in mutual radially interfering contact in the connected position of the connection 1 illustrated in the figures. The surfaces of revolution 12 and 13 forming the sealing surfaces enable to prevent the movement of fluid between the inside and the outside of the connection. The angle of taper of the sealing surfaces may be in the range 1° to 45°, preferably in the range 3° to 20°, for example 6°. The angle of taper of the sealing surfaces may be greater than the angle of taper of the threaded zones. The connection comprises an axial abutment which ensures precise positioning of the sealing zone formed by the surfaces of revolution 12 and 13 in the connected state.

Figure 2:
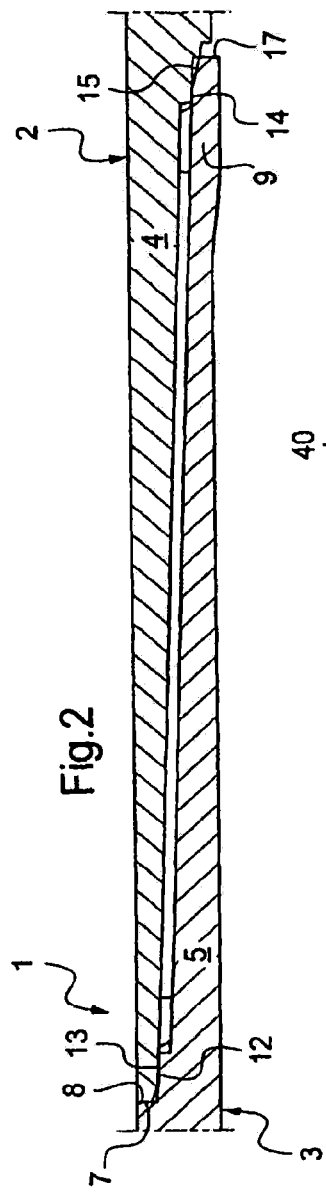
FIG. 2 diagrammatically shows a second threaded connection in longitudinal section.

The embodiment of FIG. 2 is similar to the preceding embodiment, with the exception that the abutment surfaces 7 and 8 of the female 2 and male 3 ends are disposed on the radially external side of the connection. The abutment surfaces 7 and 8 are disposed between the female 4 and male 5 threaded zones and the external surface of the connection 1. The female end 2 comprises a sealing surface 12 adjacent to the abutment surface 8 and a sealing surface 14 distal to the abutment surface 8. The sealing surface 14 is disposed between the female threaded zone 4 and the bore of the female end 2. The sealing surface 14 is substantially tapered, for example at an angle in the range 1° to 45°. The sealing surface 12 is domed and annular, for example a circular arc in axial section.

The male end 3 comprises a sealing surface 13 adjacent to the abutment surface 7 and a sealing surface 15 distal to the abutment surface 7. The sealing surface 13 is in tight contact with the sealing surface 12 in the connected or made up state. The sealing surface 15 is disposed between the male threaded zone 5 and the bore of the male end 3. The sealing surface 15 is substantially tapered, for example at an angle in the range 1° to 45°. The angle of the sealing surface 15 is smaller than the angle of the sealing surface 14. The sealing surface 15 is in tight contact with the sealing surface 14 in the connected or made up state.

The lip 9 of the male end 3 comprises a substantially radial terminal surface 17 extending between the sealing surface 15 and the bore of the male end 3. The terminal surface 17 may have a radial dimension in the range 0.5 mm to 16 mm depending on the diameter of the tube which itself may be up to 550 mm, while preferably being more than 300 mm, more preferably 350 mm. In the connected state, the terminal surface 17 is distant from any substantially radial surface of the female end 2 by at least 0.1 mm, for example. The connection comprises an axial abutment which provides precise positioning of the two sealing zones formed by the sealing surfaces 12 and 13 on the one hand and 14 and 15 on the other hand in the connected state.

Figure 3:
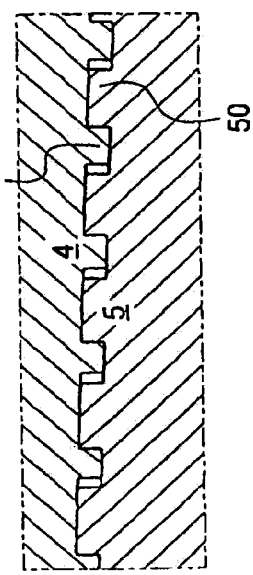
FIG. 3 diagrammatically shows a threaded zone of the connection in a longitudinal sectional half-view.

As can be seen in FIGS. 3 and 4 which correspond to the above two embodiments, the female threaded zone 4 comprises threads 40 with an axial length adjacent to the crest which is greater than the axial length adjacent to the base. The male threaded zone 5 comprises threads 50 with an axial length adjacent to the crest which is greater than the axial length adjacent to the base. The angle of inclination of a stabbing flank of one thread is positive in the clockwise direction, the angle being measured with respect to a radial plane perpendicular to the axis of the connection. The angle of inclination of a load flank of a thread is negative in the clockwise direction, the angle being taken with respect to a radial plane perpendicular to the axis of the connection. In one embodiment, the threads 40, 50 have a dovetail profile. Alternatively, the angle of inclination of a load flank is different from the angle of inclination of a stabbing flank. The angle of inclination of a stabbing flank of the female threaded zone 4 is substantially equal to the angle of inclination of a stabbing flank of the male threaded zone 5. The angle of inclination of a load flank of the female threaded zone 4 is substantially equal to the angle of inclination of a load flank of the male threaded zone 5.

A thread 40, 50 comprises a crest 41, 51, a root 42, 52, a load flank 43, 53 and a stabbing flank 44, 54. Connection curvatures are provided between the flanks and crest and between the flanks and root. The width of the crests 41, 51 and the roots 42, 52 varies as a function of the position of the corresponding thread along the axis of the tube. Said width L can be expressed as follows:

$$L = L_0 + Ax,$$

in which $L_0$ and A are constants and x is the position along the axis. The width is measured parallel to the axis of the connection 1. The diameter of the crests 41, 51 and the roots 42, 52 varies as a function of the position of the corresponding thread along the axis of the tube due to the taper of the threading. The crests 41, 51 and the roots 42, 52 of the threads 40, 50 are parallel to the axis of the threaded connection. This facilitates machining and engagement during threading-up.

The male threaded zone 5 may have a first portion in which the width of its teeth increases from a value corresponding to the width of the tooth closest to the terminal surface of the male end to a value corresponding to the width of the tooth furthest from said terminal surface, while the width of the teeth of the female threaded zone 4 decreases from a value corresponding to the width of the tooth furthest from the terminal surface of the female end to a value corresponding to the width of the tooth closest to said terminal surface, such that the threaded zones 4, 5 cooperate on threading-up to leave an axial clearance between the stabbing flanks.

The ratio between the width of the tooth closest to the terminal surface of the male end and the width of the tooth furthest from the terminal surface of the female end may be in the range 0.1 to 0.8.

In the connected state (after makeup), a radial clearance is present between the crests 41 of the threads 40 of the female threaded zone 4 and the roots 52 of the threads 50 of the male threaded zone 5. The radial clearance is of the order of 0.05 mm to 0.5 mm. The choice of radial clearance in the connected state may be guided by the desired volume of grease and the machining tolerances. A clearance of 0.15 mm or less is desirable when the machining quality is high. In the connected state, a radial clearance, which is visible in FIG. 4, is present between the roots 42 of the threads 40 and the crests 51 of the threads 50. The radial clearance is of the order of 0.05 mm to 0.5 mm.

In the connected state (after makeup), an axial clearance, visible in FIG. 4, is present between the stabbing flanks 44 and 54 respectively of the threads 40 of the female threaded zone 4 and the threads 50 of the male threaded zone 5. The axial clearance is of the order of 0.002 mm to 1 mm. The choice of axial clearance in the connected state may be guided by the desired volume of grease, the angle of the flanks and the machining tolerances. A clearance of 0.05 mm or less is desirable when high quality machining is carried out and the angle of the flanks has an absolute value of 5° or less. The load flanks 43 and 53 take up the interfering loads after make-up.

The load flank 43 of the threads 40 of the female threaded zone 4 is inclined with respect to a radial plane in order to interfere with the corresponding inclined load flank 53 of the threads 50 of the male threaded zone 5 in the case of elastic deformation of the connection, in particular under tension, with or without internal pressure. The interference is radial in order to preserve the linkage between the threadings. The threadings mutually form radial retaining hooks. The inclination of the load flank 43 is in the range −1° to −15°. Above −1°, the radial retention effect becomes low. Below −15°, the compressive strength may be affected. A preferred range is from −3° to −5°. The inclination of the load flank 53 of the threads 50 of the male threaded zone 5 is located in the same principal preferred ranges. The inclination of the load flank 53 may be equal to or different from the inclination of the load flank 43, for example by approximately 3°.

The stabbing flank 44 of the threads 40 of the female threaded zone 4 is inclined with respect to a radial plane in order to interfere with the corresponding inclined stabbing flank 54 of the threads 50 of the male threaded zone 5 in the case of elastic deformation of the connection, in particular under tensile load, with or without internal pressure. The interference is radial in order to preserve the linkage between the threadings. The threadings mutually form radial retaining hooks. The inclination of the stabbing flank 44 is in the range 1° to 15°. Below 1°, the radial retention effect becomes low. Above 15°, the compressive strength may be affected. A preferred range is from 3° to 5°. The inclination of the stabbing flank 54 of the threads 50 of the male threaded zone 5 is located in the same principal preferred ranges. The inclination of the stabbing flank 54 may be equal to or different from the inclination of the stabbing flank 44, for example by approximately 3°.

The inclination of the stabbing flank 44 may be equal to or different from the inclination of the load flank 43, for example by approximately 3°. The inclination of the stabbing flank 54 may be equal to or different from the inclination of the load flank 53, for example by approximately 3°.

The connecting curvatures may be in the range 0.005 mm to 3 mm. The connecting curvatures reduce the concentration of stresses at the foot of the load flanks and thus improve the fatigue behaviour of the connection.

The female 4 and male 5 threaded zones may constitute multiple-start threads, preferably a dual-start thread. This makes threading-up faster.

The flanks may have a dovetail profile. The geometry of dovetail threads increases the radial rigidity when they are connected, compared threads with an axial width which reduces steadily from the base to the crest of the threads.

The flanks may have a trapezoidal profile. The axial clearance between the stabbing flanks may be in the range 0.002 mm to 1 mm, preferably in the range 0.05 mm to 0.5 mm.

The radial clearance may be provided at the thread roots of a first component and/or at the thread crests of a first component. The radial clearance may be in the range 0.05 mm to 0.5 mm, preferably in the range 0.05 mm to 0.15 mm.

The load flanks may be at angle in the range −1° to −15°, preferably in the range −3° to −5°. The stabbing flanks may be at an angle in the range 1° to 15°, preferably in the range 3° to 5°. The load flanks may beat a different angle from the stabbing flanks.

The abutment surfaces in mutual contact may be at an angle in the range 0° to 45°, preferably in the range 5° to 20°, with respect to a radial plane.

The threaded zones may constitute multiple-start threads, such as dual-start threads, for example.

The male end may comprise between its distal surface and its threaded zone (5), a metal/metal sealing surface cooperating with a corresponding sealing surface provided on the female end.

The female end may comprise between its distal surface and its threaded zone (6), a metal/metal sealing surface cooperating with a corresponding sealing surface provided on the male end.

The threaded zones may have a taper generatrix with a slope in the range 4% to 15%.

The invention is not limited to the examples of connections and tubes described above, solely by way of example, but it encompasses any variations which could be envisaged by the skilled person in the context of the attached claims.

The invention claimed is:

1. A threaded connection, comprising:
   a first and a second tubular component, the first tubular component comprising a male end comprising a distal surface and a threaded zone disposed on an external peripheral surface of the male end, the second tubular component comprising a female end comprising a distal surface and a threaded zone disposed on an internal peripheral surface of the female end, the threaded zone of the male end being threaded up into the threaded zone of the female end,
   the threaded zones comprising respective male and female threads including a width which increases from the respective distal surface of the male and female ends,
   the threads comprising load flanks including negative angles over at least a portion of a radial dimension of the load flanks, and stabbing flanks, with a radial clearance subsisting in a connected state of at least one between crests of the male threads and roots of the female threads and between crests of the female threads and roots of the male threads, with an axial clearance subsisting in the connected state between the stabbing flanks of the male and female threads,
   the distal surface of at least one of the male end and the female end being brought into axial abutting contact against a corresponding abutment surface,
   the stabbing flanks being at an angle in a range 1° to 15°, and
   the female end comprising a substantially tapered surface and a recess between the threaded zone of the female end and an abutment surface of the female end, the recess including a substantially cylindrical surface and a surface of revolution disposed between the threaded zone of the female end and the substantially tapered surface, the substantially tapered surface being adjacent to the abutment surface of the female end.

2. A threaded connection according to claim 1, in which the axial clearance between the stabbing flanks is in a range 0.002 mm to 1 mm.

3. A threaded connection according to claim 1, in which the radial clearance is provided at the roots of the threads of the male threaded zones.

4. A threaded connection according to claim 1, in which the radial clearance is provided at the crest of the threads of the male threaded zones.

5. A threaded connection according to claim 1, in which the radial clearance is in a range 0.05 mm to 0.5 mm.

6. A threaded connection according to claim 1, in which the load flanks are at an angle in a range −1° to −15°.

7. A threaded connection according to claim 1, in which stabbing flanks are at an angle in a range 3° to 5°.

8. A threaded connection according to claim 1, in which the load flanks are at an angle which differs from the stabbing flanks.

9. A threaded connection according to claim 1, in which the distal surface of the male end is in axial abutting contact with the corresponding abutment surface of the female end.

10. A threaded connection according to claim 1, in which the distal surface of the female end is in axial abutting contact with the corresponding abutment surface of the male end.

11. A threaded connection according to claim 1, in which the abutment surfaces in mutual contact are at an angle in a range 0° to 45° with respect to a radial plane.

12. A threaded connection according to claim 1, in which the male end comprises, between the distal surface of the male end and the threaded zone of the male end, a metal/metal sealing surface cooperating with a corresponding sealing surface provided on the female end.

13. A threaded connection according to claim 1, in which the female end comprises, between the distal surface of the female end and the threaded zone of the female end, a metal/metal sealing surface cooperating with a corresponding sealing surface provided on the male end.

14. A threaded connection according to claim 1, in which the threaded zones include a taper generatrix with a slope in a range 4% to 15%.

15. A threaded connection according to claim 1, in which the axial clearance between the stabbing flanks is in a range 0.05 mm to 0.5 mm.

16. A threaded connection according to claim 1, in which the radial clearance is in a range 0.05 mm to 0.15 mm.

17. A threaded connection according to claim 1, in which the load flanks are at an angle in a range −3° to −5°.

18. A threaded connection according to claim 1, in which the abutment surfaces in mutual contact are at an angle in a range 5° to 20° with respect to a radial plane.

* * * * *